United States Patent
Siefring

(10) Patent No.: US 9,404,497 B2
(45) Date of Patent: Aug. 2, 2016

(54) METHOD AND APPARATUS FOR SCROLL ALIGNMENT

(71) Applicant: Emerson Climate Technologies, Inc., Sidney, OH (US)

(72) Inventor: Christopher Nicholas Siefring, Fort Recovery, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 100 days.

(21) Appl. No.: 13/856,891

(22) Filed: Apr. 4, 2013

(65) Prior Publication Data

US 2013/0287617 A1    Oct. 31, 2013

Related U.S. Application Data

(60) Provisional application No. 61/640,110, filed on Apr. 30, 2012.

(51) Int. Cl.
    *F04C 18/02*    (2006.01)
    *F16C 35/02*    (2006.01)
    *F04C 23/00*    (2006.01)

(52) U.S. Cl.
    CPC ......... *F04C 18/0207* (2013.01); *F04C 18/0215* (2013.01); *F04C 23/008* (2013.01); *F04C2230/603* (2013.01); *F04C 2240/56* (2013.01); *F04C 2240/805* (2013.01); *F16C 35/02* (2013.01); *Y10T 29/4924* (2015.01)

(58) Field of Classification Search
    CPC ............. F04C 18/0207; F04C 18/0215; F04C 2230/603; F04C 2240/56; F04C 2240/805
    USPC ............... 418/55.1–55.6, 57; 417/410.5, 310, 417/902, 410.3, 423.12
    See application file for complete search history.

(56) References Cited

U.S. PATENT DOCUMENTS

| 5,580,230 A | 12/1996 | Keifer et al. |
| 6,027,321 A | 2/2000 | Shim et al. |
| 2005/0201883 A1 | 9/2005 | Clendenin et al. |

FOREIGN PATENT DOCUMENTS

| JP | H02277995 A | 11/1990 |
| JP | H1061568 A | 3/1998 |
| JP | 2002161876 A | 6/2002 |

OTHER PUBLICATIONS

International Search Report regarding Application No. PCT/US2013/038822, mailed Aug. 12, 2013.
Written Opinion of the International Searching Authority regarding Application No. PCT/US2013/038822, mailed Aug. 12, 2013.
Office Action regarding Chinese Patent Application No. 201380022652.9, dated Nov. 4, 2015. Translation provided by Unitalen Attorneys at Law.

*Primary Examiner* — Nicholas J Weiss
*Assistant Examiner* — Wesley Harris
(74) *Attorney, Agent, or Firm* — Harness, Dickey & Pierce, P.L.C.

(57) ABSTRACT

A compressor may include a shell, a bearing housing supported within the shell, an orbiting scroll, a non-orbiting scroll meshingly engaged with the orbiting scroll, fasteners and a drive shaft. The bearing housing may include a central body defining a bore and arms extending radially outward from a central body and defining circumferentially extending grooves. The circumferentially extending grooves may include inner side walls, outer side walls and base regions extending regionally between the inner and outer side walls and defining fastener receiving apertures. The orbiting scroll may be supported on the bearing housing and a non-orbiting scroll may be meshingly engaged with the orbiting scroll and may include flanges defining flange apertures. The fasteners may extend through the flange apertures and the fasteners receiving apertures and secure the non-orbiting scroll to the bearing housing. The drive shaft may extend through the bore and be engaged with the orbiting scroll.

20 Claims, 3 Drawing Sheets

METHOD AND APPARATUS FOR SCROLL ALIGNMENT

CROSS-REFERENCE TO RELATED APPLICATIONS

This application claims priority to U.S. Provisional Application No. 61/640,110, filed on Apr. 30, 2012. The entire disclosure of the above application is incorporated herein by reference.

FIELD

The present disclosure relates to scroll alignment in compressors.

SUMMARY

This section provides a general summary of the disclosure, and is not comprehensive of its full scope or all of its features.

A compressor may include a shell, a bearing housing supported within the shell, an orbiting scroll, a non-orbiting scroll meshingly engaged with the orbiting scroll, fasteners and a drive shaft. The bearing housing may include a central body defining a bore and arms extending radially outward from a central body and defining circumferentially extending grooves. The circumferentially extending grooves may include inner side walls, outer side walls and base regions extending radially between the inner and outer side walls and defining fastener receiving apertures. The orbiting scroll may be supported on the bearing housing and the non-orbiting scroll may be meshingly engaged with the orbiting scroll and may include a flange defining flange apertures. The fasteners may extend through the flange apertures and the fastener receiving apertures and secure the non-orbiting scroll to the bearing housing. The drive shaft may extend through the bore and be engaged with the orbiting scroll.

The grooves may each be arc-shaped with open circumferential ends. The circumferentially extending grooves may be concentric to a circumferential wall defining the bore in the bearing housing.

The fasteners may include bushings located in each of the grooves and aligned with the fastener receiving apertures with the fasteners extending through the bushings. An outer diameter of the bushing within the groove may be at least ninety-nine percent of a minimum radial distance defined between the inner and outer side walls. Each of the grooves may define a circumferential extent that is at least twenty-five percent greater than the outer diameter of the bushing. The inner and outer side walls may extend axially from the base a distance equal to at least twenty percent of a height of the bushings. The arms may be fixed to the shell.

A method of forming a compressor bearing housing may include machining a circumferential wall defining a bore in a central body of the compressor bearing housing. The method may additionally include machining circumferentially extending grooves in arms of the bearing housing that extend radially outward from the central body. The circumferentially extending grooves may be concentric to the circumferential wall defining the bore in the central body and may provide a locating feature for centering a non-orbiting scroll on the bearing housing.

The circumferentially extending grooves may include inner side walls, outer side walls and base regions extending radially between the inner and outer side walls and defining fastener receiving apertures. The machining of the grooves may form arc-shaped grooves in each of the arms with open circumferential ends defined in each of the grooves. The method may additionally include locating the non-orbiting scroll on the bearing housing and positioning bushings within flange apertures defined in flanges of the non-orbiting scroll and into the circumferentially extending grooves.

An outer diameter of the bushing within the groove may be at least ninety-nine percent of a minimum radial distance defined between the inner and outer side walls defining the groove. Each of the grooves may define a circumferential extent that is at least twenty-five percent greater than the outer diameter of the bushing. The inner and outer side walls defining the groove may extend axially from the base region of the groove a distance equal to at least twenty percent of a height of the bushings.

The method may additionally include inserting bolts through the bushings and threading the bolts into engagement with the fastener receiving apertures defined in the bearing housing. The non-orbiting scroll may be centered relative to the bearing housing solely by the bushings and the grooves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The present teachings are suitable for incorporation in many different types of scroll and rotary compressors, including hermetic machines, open drive machines and non-hermetic machines. For exemplary purposes, a compressor 10 is shown as a hermetic scroll refrigerant-compressor of the low-side type, i.e., where the motor and compressor are cooled by suction gas in the hermetic shell, as illustrated in the vertical section shown in FIG. 1.

Figure 1:
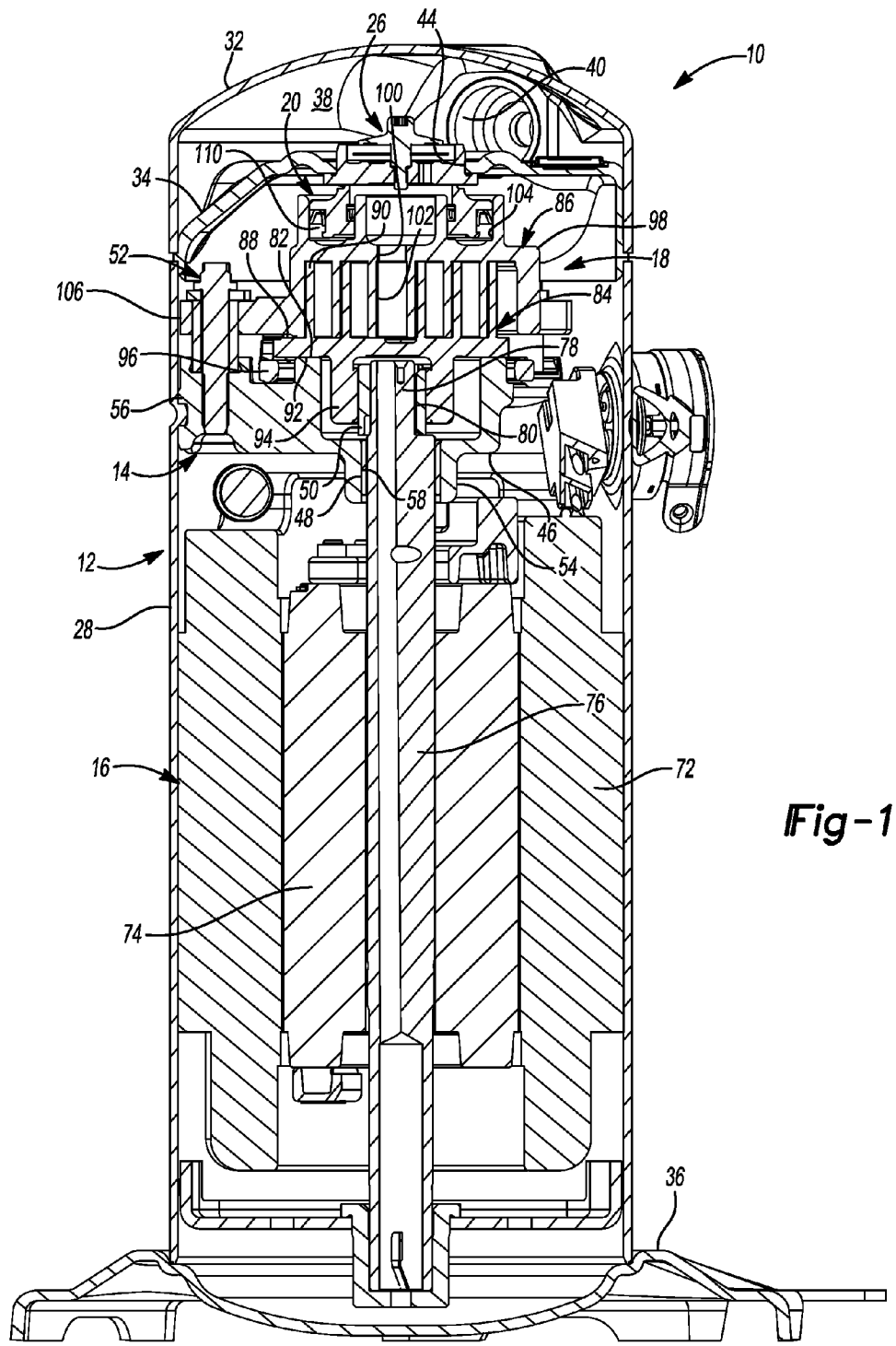
FIG. 1 is a section view of a compressor according to the present disclosure.
Figure 2:
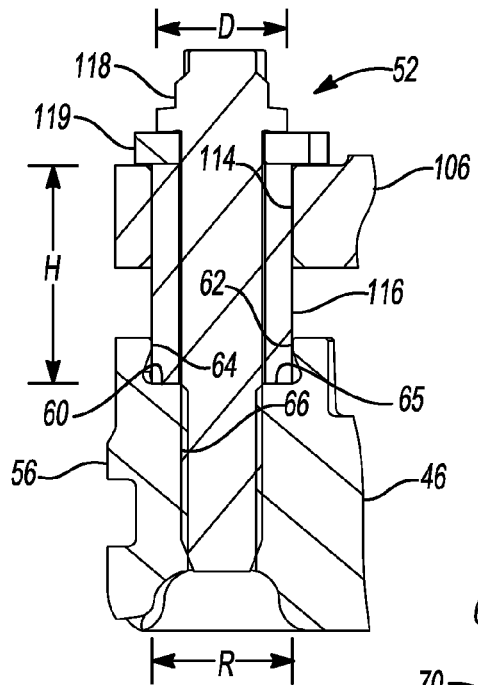
FIG. 2 is a fragmentary section view of the compressor shown in FIG. 1.
Figure 3:
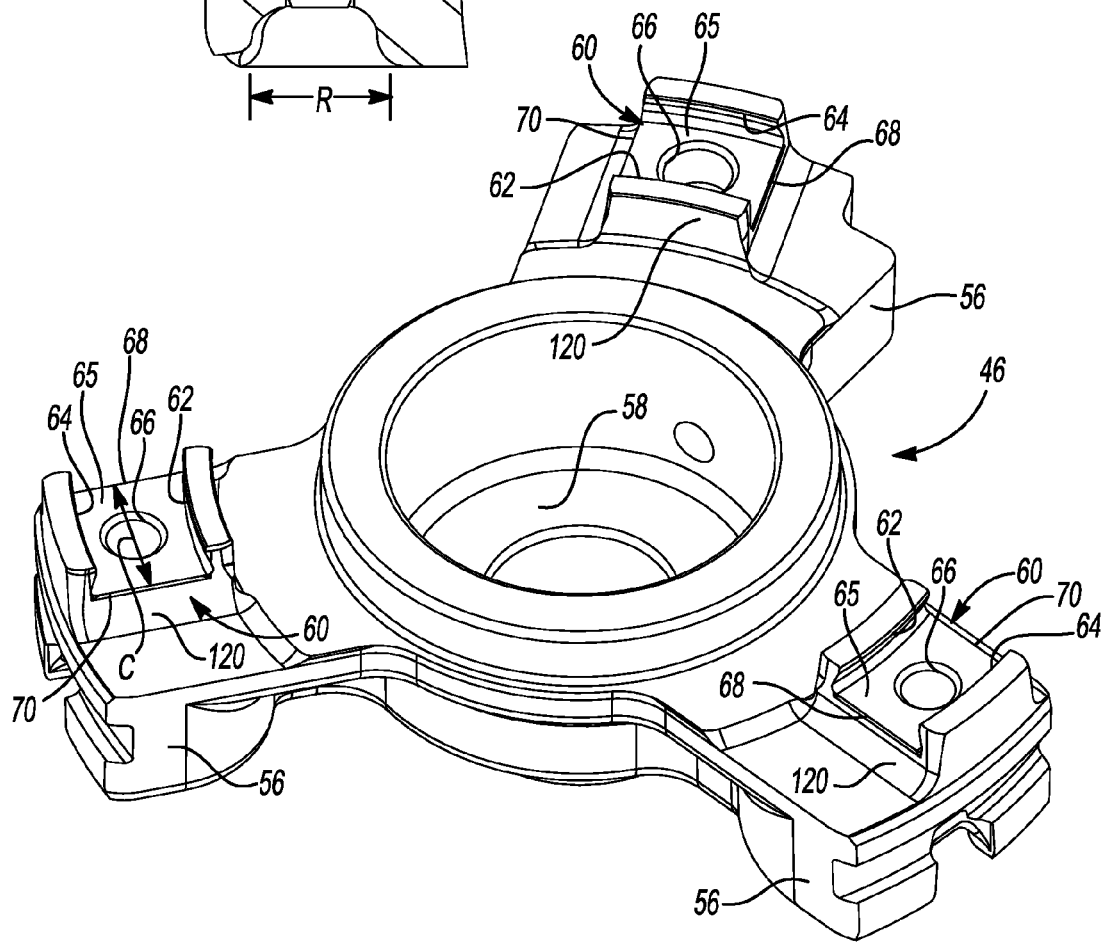
FIG. 3 is a perspective view of the main bearing housing from the compressor of FIG. 1.

With reference to FIGS. 1-3, the compressor 10 may include a hermetic shell assembly 12, a bearing housing assembly 14, a motor assembly 16, a compression mechanism 18, a seal assembly 20, and a discharge valve assembly 26. The shell assembly 12 may house the bearing housing assembly 14, the motor assembly 16, the compression mechanism 18, and the discharge valve assembly 26.

The shell assembly 12 may generally form a compressor housing and may include a cylindrical shell 28, an end cap 32 at the upper end thereof, a transversely extending partition 34, and a base 36 at a lower end thereof. The end cap 32 and the partition 34 may generally define a discharge chamber 38. The discharge chamber 38 may generally form a discharge muffler for compressor 10. While illustrated as including the discharge chamber 38, it is understood that the present disclosure applies equally to direct discharge configurations. The shell assembly 12 may define an opening 40 in the end cap 32 forming a discharge outlet. The shell assembly 12 may additionally define a suction inlet (not shown). The partition 34 may include a discharge passage 44 therethrough providing communication between the compression mechanism 18 and the discharge chamber 38.

The bearing housing assembly 14 may include a main bearing housing 46, a bearing 48, a drive bushing 50, and fasteners 52. The main bearing housing 46 may include a central body 54 with arms 56 extending radially outward from the central body 54. The central body 54 may include a bore defined by a circumferential wall 58 housing the bearing 48. The arms 56 may be engaged with the shell 28 to support the main bearing housing 46 within the shell 28. The main bearing housing 46 may be fixed to the shell 28 at a plurality of points in any desirable manner, such as staking.

The arms 56 may define circumferentially extending grooves 60 including inner side walls 62, outer side walls 64 and base regions 65 extending radially between the inner and outer side walls 62, 64. The arms 56 may additionally define fastener-receiving apertures 66 extending through the base regions 65. The grooves 60 may each be arc-shaped with open circumferential ends 68, 70. The grooves 60 may additionally be concentric to the circumferential wall 58 defining the bore in the central body 54.

As seen in FIG. 1, the motor assembly 16 may include a motor stator 72, a rotor 74, and a drive shaft 76. The motor stator 72 may be press fit into the shell 28. The rotor 74 may be press fit on drive shaft 76 and the drive shaft 76 may be rotationally driven by the rotor 74. The drive shaft 76 may extend through the bore defined by the circumferential wall 58 and may be rotationally supported within the main bearing housing 46 by the bearing 48.

The drive shaft 76 may include an eccentric crank pin 78 having a flat 80 thereon. The drive bushing 50 may be located on the eccentric crank pin 78 and may be engaged with the compression mechanism 18. The main bearing housing 46 may define a thrust bearing surface 82 supporting the compression mechanism 18. The compression mechanism 18 may include an orbiting scroll 84 and a non-orbiting scroll 86 meshingly engaged with one another.

The orbiting scroll 84 may include an end plate 88 having a spiral vane or wrap 90 on the upper surface thereof and an annular flat thrust surface 92 on the lower surface. The thrust surface 92 may interface with the annular flat thrust bearing surface 82 on the main bearing housing 46. A cylindrical hub 94 may project downwardly from the thrust surface 92 and may have the drive bushing 50 rotatably disposed therein. The drive bushing 50 may include an inner bore receiving the crank pin 78. The crank pin flat 80 may drivingly engage a flat surface in a portion of the inner bore of drive bushing 50 to provide a radially compliant driving arrangement. An Oldham coupling 96 may be engaged with the orbiting and non-orbiting scrolls 84, 86 to prevent relative rotation therebetween.

The non-orbiting scroll 86 may include an end plate 98 defining a discharge passage 100 and having a spiral wrap 102 extending from a first side thereof, an annular recess 104 defined in a second side thereof opposite the first side, and a series of radially outwardly extending flanged portions 106 (FIG. 1) engaged with the fasteners 52. The end plate 98 may additionally include a biasing passage (not shown) in fluid communication with the annular recess 104 and an intermediate compression pocket defined by the orbiting and non-orbiting scrolls 84, 86. The seal assembly 20 may form a floating seal assembly and may be sealingly engaged with non-orbiting scroll 86 to define an axial biasing chamber 110.

The flanged portions 106 may include flange apertures 114 (FIG. 2). The fasteners 52 may rotationally fix the non-orbiting scroll 86 relative to the main bearing housing 46 while allowing axial displacement of non-orbiting scroll 86 relative to the main bearing housing 46. The fasteners 52 may include bushings 116, bolts 118 and washers 119. The bushings 116 may extend through the flange apertures 114 in the non-orbiting scroll 86 and may be located in the grooves 60 and aligned with the fastener-receiving apertures 66.

As seen in FIG. 2, the outer diameter (D) of the bushing 116 may be at least ninety-nine percent of a minimum radial distance (R) defined between the inner side wall 62 and the outer side wall 64. Each of the grooves 60 may define a circumferential extent (C), shown in FIG. 3, that is at least twenty-five percent greater than the outer diameter (D) of the bushing 116. The inner side wall 62 and the outer side wall 64 may each extend axially from the base region 65 a distance equal to at least twenty percent of the height (H) of the bushing 116.

The arrangement shown in FIGS. 1-4 illustrates elevated regions 120 extending axially outward on the arms 56 defining the grooves 60. However, alternate arrangements may include arms 156 defining a generally planar surface 158 defining grooves 160 as seen in FIG. 5.

In either of the arrangements discussed above, the grooves 60, 160 may generally provide for alignment of the non-orbiting scroll 86 relative to the main bearing housing 46 and, more specifically, centering the non-orbiting scroll 86 relative to the main bearing housing 46. The following discussion will reference the arrangement of FIGS. 1-3 for simplicity with the understanding that the description applies equally to the arrangement shown in FIG. 5.

Figure 4:
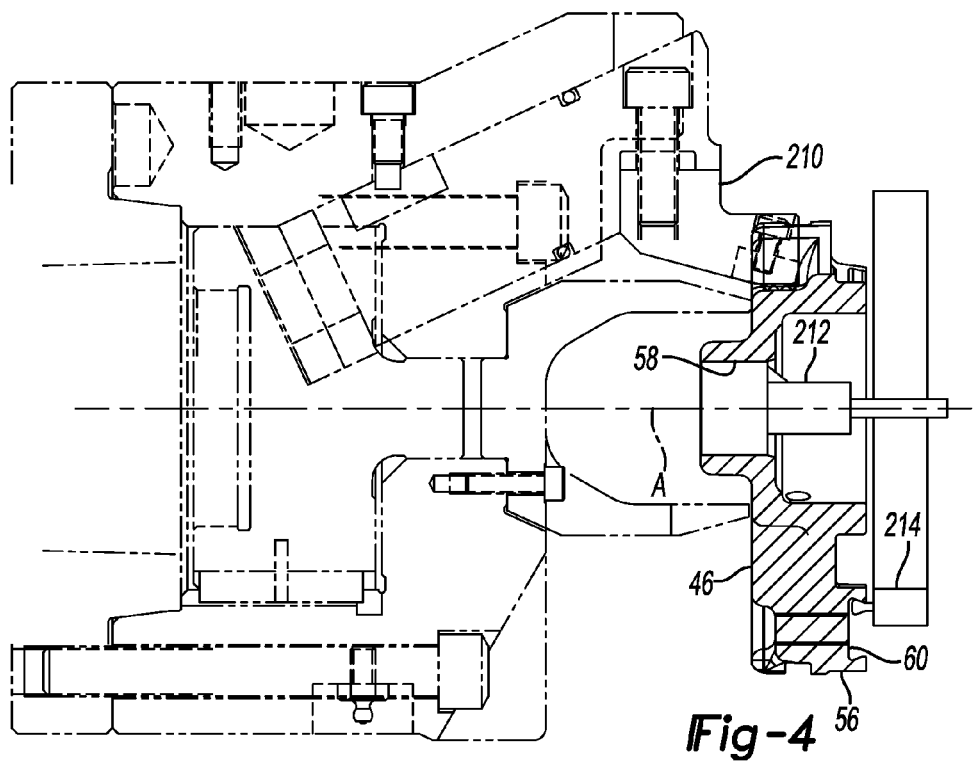
FIG. 4 is a plan view of a machining operation for the main bearing housing shown in FIG. 3.
Figure 5:
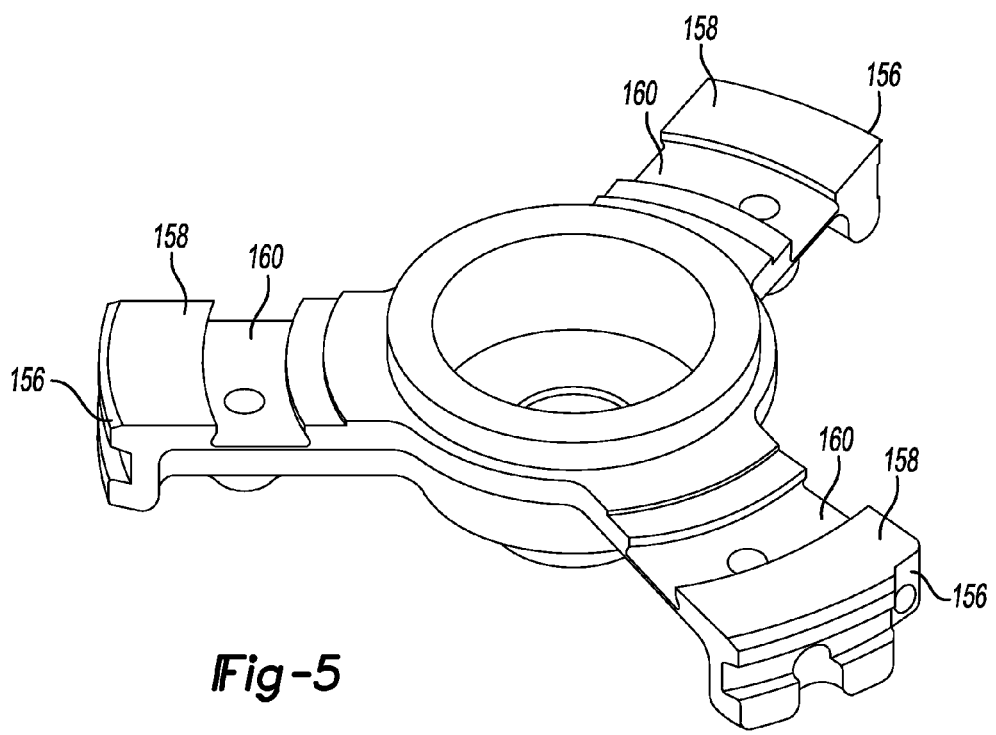
FIG. 5 is a perspective view of an alternate main bearing housing according to the present disclosure.

As seen in FIG. 4, the main bearing housing 46 may be retained in a fixture 210 during machining operations. The fixture 210 may generally clamp the main bearing housing 46 in position while first and second machining tools 212, 214 form the bore defined by a circumferential wall 58 and the grooves 60. The main bearing housing 46 may be rotated about a rotational axis (A) and the first machining tool 212 may be displaced axially along the rotational axis to machine the circumferential wall 58 that defines the bore housing the bearing 48. The second machining tool 214 may be displaced axially along the rotational axis (A) and perpendicular to the rotational axis (A) while the main bearing housing 46 is rotated to machine the grooves 60 in the arms 56. The common rotational axis (A) as well as the first and second machining tools 212, 214 cutting while the main bearing housing 46 is rotated about the rotational axis (A) may provide for the grooves 60 being concentric to the circumferential wall 58. This concentric arrangement may center the non-orbiting scroll 86 relative to the main bearing housing 46.

During assembly, the orbiting and non-orbiting scrolls 84, 86 are located on the main bearing housing 46. The bushings 116 are then inserted through flange apertures 114 in the non-orbiting scroll 86 and located in the grooves 60 in the main bearing housing 46. The bolts 118 and washers 119 may then be fastened to the main bearing housing 46. The combination of the bushings 116 and the grooves 60 may center the non-orbiting scroll 86 relative to the main bearing housing 46 without the use of additional alignment methods such as alignment pins.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A compressor comprising:
   a shell;
   a bearing housing supported within said shell and including:
      a central body having a circumferential wall defining a bore; and
      arms extending radially outward from said central body and defining circumferentially extending grooves including inner side walls, outer side walls and base regions extending radially between said inner and outer side walls and defining fastener-receiving apertures, each of said circumferentially extending grooves being concentric to said circumferential wall;
   an orbiting scroll supported on said bearing housing;
   a non-orbiting scroll meshingly engaged with said orbiting scroll and including a flange defining flange apertures;
   fasteners extending through said flange apertures and said fastener-receiving apertures and securing said non-orbiting scroll to said bearing housing;
   bushings receiving said fasteners and received in said circumferentially extending grooves and in said flange apertures; and
   a drive shaft extending through said bore and engaged with said orbiting scroll.

2. The compressor of claim 1, wherein said grooves are each arc-shaped with open circumferential ends.

3. The compressor of claim 1, wherein an outer diameter of said bushing within said groove is at least 99 percent of a minimum radial distance defined between said inner and outer side walls.

4. The compressor of claim 3, wherein each of said grooves define a circumferential extent that is at least 25 percent greater than said outer diameter of said bushing.

5. The compressor of claim 1, wherein said inner and outer side walls extend axially from said base a distance equal to at least 20 percent of a height of said bushings.

6. The compressor of claim 1, wherein said arms are fixed to said shell.

7. The compressor of claim 1, wherein said inner side wall is convex and concentric to said circumferential wall.

8. The compressor of claim 1, wherein each of said grooves includes an inner radius and an outer radius, said inner radius extending from said inner side wall to said base region, said outer radius extending from said outer side wall to said base region.

9. An assembly comprising:
   a compressor bearing housing including:
      a central body including a circumferential wall defining a bore adapted to receive a drive shaft; and
      arms extending radially outward from said central body and defining circumferentially extending grooves including inner side walls, outer side walls and base regions extending radially between said inner and outer side walls and defining fastener-receiving apertures, wherein each of said circumferentially extending grooves is concentric to said circumferential wall; and
   bushings received in said circumferentially extending grooves.

10. The assembly of claim 9, wherein said grooves are each arc-shaped with open circumferential ends.

11. The assembly of claim 9, wherein said inner side wall is convex and concentric to said circumferential wall.

12. The assembly of claim 9, wherein each of said grooves includes an inner radius and an outer radius, said inner radius extending from said inner side wall to said base region, said outer radius extending from said outer side wall to said base region.

13. A method comprising:
   machining a circumferential wall defining a bore in a central body of a compressor bearing housing; and
   machining circumferentially extending grooves in arms of the bearing housing that extend radially outward from the central body, each of the circumferentially extending grooves being concentric to the circumferential wall defining the bore in the central body and providing a locating feature for centering a non-orbiting scroll on the bearing housing;
   positioning bushings within flange apertures defined in flanges of said non-orbiting scroll; and positioning said non-orbiting scroll relative to said bearing housing by positioning said bushings in said circumferentially extending grooves.

14. The method of claim 13, wherein the circumferentially extending grooves include inner side walls, outer side walls and base regions extending radially between said inner and outer side walls and defining fastener-receiving apertures.

15. The method of claim 14, wherein said machining the grooves forms arc-shaped grooves in each of the arms having open circumferential ends.

16. The method of claim 13, wherein an outer diameter of the bushing within the groove is at least 99 percent of a minimum radial distance defined between the inner and outer side walls defining the groove.

17. The method of claim 16, wherein each of the grooves define a circumferential extent that is at least 25 percent greater than the outer diameter of the bushing.

18. The method of claim 13, wherein the inner and outer side walls defining the groove extend axially from the base region of the groove a distance equal to at least 20 percent of a height of the bushings.

19. The method of claim 13, further comprising inserting bolts through the bushings and threading the bolts into engagement with the fastener-receiving apertures defined in the bearing housing.

20. The method of claim 13, wherein the non-orbiting scroll is centered relative to the bearing housing solely by the bushings and the grooves.

* * * * *